United States Patent
Mondello et al.

(10) Patent No.: US 11,258,600 B2
(45) Date of Patent: Feb. 22, 2022

(54) SECURE COMMUNICATION IN ACCESSING A NETWORK

(71) Applicant: Micron Technology, Inc., Boise, ID (US)

(72) Inventors: Antonino Mondello, Messina (IT); Alberto Troia, Munich (DE)

(73) Assignee: Micron Technology, Inc., Boise, ID (US)

( * ) Notice: Subject to any disclaimer, the term of this patent is extended or adjusted under 35 U.S.C. 154(b) by 382 days.

(21) Appl. No.: 16/362,786

(22) Filed: Mar. 25, 2019

(65) Prior Publication Data
US 2020/0313866 A1 Oct. 1, 2020

(51) Int. Cl.
*H04L 29/06* (2006.01)
*H04W 8/20* (2009.01)
*H04L 9/08* (2006.01)
*H04W 12/04* (2021.01)
*H04L 9/30* (2006.01)

(52) U.S. Cl.
CPC ............. *H04L 9/088* (2013.01); *H04L 9/30* (2013.01); *H04W 12/04* (2013.01)

(58) Field of Classification Search
CPC .......... H04L 9/088; H04L 9/30; H04W 12/04; H04W 12/069; H04W 12/03; H04W 12/71; H04W 12/72; H04W 12/40
See application file for complete search history.

(56) References Cited

U.S. PATENT DOCUMENTS

| 8,880,040 B2 | 11/2014 | Schreiner et al. |
| 9,730,072 B2 | 8/2017 | Yang et al. |
| 2016/0255567 A1 | 9/2016 | Petersson et al. |
| 2017/0195318 A1* | 7/2017 | Liu ..................... H04L 67/2809 |

FOREIGN PATENT DOCUMENTS

| EP | 3151593 A1 * | 4/2017 | .......... H04W 12/037 |
| KR | 10-1822605 B1 | 1/2018 | |

(Continued)

OTHER PUBLICATIONS

Dennis Mattoon; "Implementing DICE—Trusted Computing Group"; https://develop.trustedcomputinggroup.org/2018/03/20/implementing-dice/; Year: Mar. 2018; pp. 1-19 (Year: 2018).*

(Continued)

*Primary Examiner* — Kendall Dolly
*Assistant Examiner* — Courtney D Fields
(74) *Attorney, Agent, or Firm* — Brooks, Cameron & Huebsch, PLLC

(57) ABSTRACT

Secure communication in accessing a network is described herein. An example apparatus can include a memory and a processor coupled to the memory. The processor can be configured to receive an identity public key from the identity device. The identity public key can be received in response to providing, to the identity device, a request to modify content of the identity device. The processor can be further configured to encrypt data corresponding to subscriber information using the identity public key, provide (to the identity device) the encrypted data to store the subscriber information in the identity device, and access a network operated by a network operator via the data stored in the identity device.

21 Claims, 8 Drawing Sheets

(56) References Cited

FOREIGN PATENT DOCUMENTS

WO   2016-168409 A1   10/2016
WO   2017-058067 A1    4/2017

OTHER PUBLICATIONS

Chase Synder; "Five Reasons You Need to Decrypt Traffic for SecOps Analysis"; https://www.extrahop.com/company/blog/2018/five-reasons-secops-needs-decryption/; Year: Oct. 2018, pp. 1-9 (Year: 2018).*

Akshat Pradhan; K. Marimuthu; R. Niranchana; P. Vijayakumar; "Secure Protocol for Subscriber Identity Module"; 2017 Second International Conference on Recent Trends and Challenges in Computational Models (ICRTCCM); Year: 2017 | Conference Paper| Publisher: IEEE; pp. 358-362 (Year: 2017).*

U.S. Appl. No. 15/853,498, entitled, "Physical Unclonable Function Using Message Authentication Code", filed Dec. 22, 2017, 28 pages.

U.S. Appl. No. 16/201,652, entitled, "Parking Infrastructure Powered by a Decentralized, Distributed Database", filed Nov. 27, 2018, 27 pages.

U.S. Appl. No. 15/993,119, entitled, "Transmission of Vehicle Route Information by Passive Devices", filed May 30, 2018, 25 pages.

U.S. Appl. No. 16/034,763, entitled, "Secure Vehicular Communication", filed Jul. 13, 2018, 37 pages.

U.S. Appl. No. 16/034,809, entitled, "Secure Vehicular Services Communication", filed Jul. 13, 2018, 36 pages.

PCT International Application No. PCT/IB2019/000089, entitled, "Method for Improving Safety of a Component or System Running a Firmware or a Finite State Machine", filed Feb. 22, 2019, 42 pages.

International Search Report and Written Opinion from related International Application No. PCT/US2020/021628, dated Jul. 2, 2020, 14 pages.

* cited by examiner

SECURE COMMUNICATION IN ACCESSING A NETWORK

TECHNICAL FIELD

The present disclosure relates generally to apparatuses, methods, and systems, and more particularly, to secure communication in accessing a network.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), and resistance variable memory such as phase change random access memory (PCRAM), resistive random access memory (RRAM), and magnetic random access memory (MRAM), among others.

Memory devices can be combined together to form a solid state drive (SSD), an embedded MultiMediaCard (e.MMC), and/or a universal flash storage (UFS) device. An SSD, e.MMC, and/or UFS device can include non-volatile memory (e.g., NAND flash memory and/or NOR flash memory), and/or can include volatile memory (e.g., DRAM and/or SDRAM), among various other types of non-volatile and volatile memory. Non-volatile memory may be used in a wide range of electronic applications such as personal computers, portable memory sticks, digital cameras, cellular telephones, portable music players such as MP3 players, movie players, among others.

Flash memory devices can include memory cells storing data in a charge storage structure such as a floating gate, for instance. Flash memory devices typically use a one-transistor memory cell that allows for high memory densities, high reliability, and low power consumption. Resistance variable memory devices can include resistive memory cells that can store data based on the resistance state of a storage element (e.g., a resistive memory element having a variable resistance).

Memory cells can be arranged into arrays, and memory cells in an array architecture can be programmed to a target (e.g., desired) state. For instance, electric charge can be placed on or removed from the charge storage structure (e.g., floating gate) of a flash memory cell to program the cell to a particular data state. The stored charge on the charge storage structure of the cell can indicate a threshold voltage (Vt) of the cell. A state of a flash memory cell can be determined by sensing the stored charge on the charge storage structure (e.g., the Vt) of the cell.

Many threats can affect the operation of a memory device and/or the data stored in the memory cells of the memory device. Such threats can cause significant financial loss, and/or can present significant safety and/or security issues.

DETAILED DESCRIPTION

Figure 1:
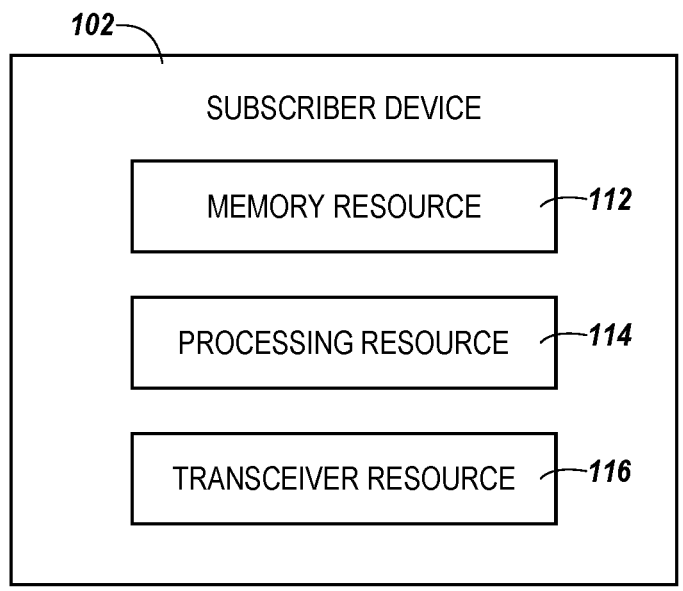
FIG. 1 is a block diagram of an example subscriber device in accordance with an embodiment of the present disclosure.

Secure communication in accessing a network is described herein. An example apparatus can include a memory and a processor coupled to the memory. The processor can be configured to receive an identity public key from the identity device. The identity public key can be received in response to providing, to the identity device, a request to modify content of the identity device. The processor can be further configured to encrypt data corresponding to subscriber information using the identity public key, provide (to the identity device) the encrypted data to store the subscriber information in the identity device, and access a network operated by a network operator via the data stored in the identity device.

User devices may store data corresponding to personal information that can identify themselves within a network such that a service provider of the network can authorize them based on the personal information. Often, personal information may be stored within user devices and/or in a remote memory device that the user device can wirelessly access to. In either case, the personal information may be exposed to many threats from a hacker and/or other malicious, and such hacking activities can cause significant financial loss, and/or can present significant safety and/or security issues.

Some previous approaches offer anti-hacking mechanisms that can include, for instance, timestamps, random number generators, and/or counters (e.g., monotonic counters), which can provide a piece of information that changes each time the personal information are accessed and/or exchanged. However, such previous anti-hacking mechanisms may require additional components and/or circuitry dedicated specifically to the anti-hacking functionality, which can increase the size and/or complexity of the circuitry of the memory.

In contrast, embodiments of the present disclosure can provide an anti-hacking mechanism that ensures a secure memory, while not requiring additional circuitry dedicated specifically to the anti-replay functionality, which can reduce the size and/or complexity of the circuitry of the memory as compared to memory utilizing previous anti-hacking mechanisms. For instance, such an anti-hacking mechanism may utilize the existing circuitry of the memory (e.g., the existing firmware of the memory device) to provide the anti-hacking functionality, without having to add additional (e.g., new) components or circuitry dedicated specifically to the anti-hacking functionality.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 302 in FIG. 3.

FIG. 1 is a block diagram of an example subscriber device 102 in accordance with an embodiment of the present disclosure. As used herein, a subscriber device may refer to a device a subscriber (e.g., user) of a particular network operator utilizes to access a network (e.g., network 308) operated by a particular network operator. As used herein, a network operator may refer to an entity that provides, to a user, an access to and/or service via a network. The terms "network operator," "mobile operator," "service provider," and "carrier" are used interchangeably herein and may have the same meaning, as appropriate to the context.

The subscriber device 102 can include an user equipment (UE) devices such as a laptop computer, personal computer, digital camera, digital recording and playback device, mobile telephone, PDA, memory card reader, interface hub, or Internet of Things (IoT) enabled device, such as, for instance, an automotive (e.g., vehicular and/or transportation infrastructure) IoT enabled device or a medical (e.g., implantable and/or health monitoring) IoT enabled device, among other host systems, and can include a memory access device (e.g., a processor). One of ordinary skill in the art will appreciate that "a processor" can intend one or more processors, such as a parallel processing system. A number of coprocessors, etc.

The subscriber device 102 can include a memory resource 112, a processing resource 114, and a transceiver resource 116, as illustrated in FIG. 1. The memory resource 112 (which can be also referred to as "memory") may include memory (e.g., memory cells) arranged, for example, in a number of bank groups, banks, bank sections, subarrays, and/or rows of a number of memory devices. In some embodiments, the memory resource 112 may include a plurality of memory devices such as a number of volatile memory devices formed and/or operable as RAM, DRAM, SRAM, SDRAM, and/or TRAM, among other types of volatile memory devices. In some embodiments, the memory resource 112 may include a number of non-volatile memory devices formed and/or operable as PCRAM, RRAM, FeRAM, MRAM, and/or STT RAM, phase change memory, 3DXPoint, and/or Flash memory devices, among other types of non-volatile memory devices. In some embodiments, the memory resource 112 may include a combination of a number of volatile memory devices and a number of non-volatile memory device, as described herein.

Although not shown in FIG. 1, the memory resource 112 can be coupled to and/or include a controller that can send commands to perform operations on the memory resource 112, including operations to sense (e.g., read), program (e.g., write), move, and/or erase data.

The processing resource 114 can be coupled to the memory resource 112 and to the transceiver resource 116, and configured to access data stored in the memory resource 112 and/or data stored in a server (e.g., server 306), network (e.g., network 308), and/or an identity device (e.g., identity device 304) via a transceiver (e.g., transceiver resource 116).

As used herein, a "transceiver" may be referred to as a device including both a transmitter and a receiver. In an embodiment, the transceiver may be and/or include a number of radio frequency (RF) transceivers. The transmitter and receiver may, in a number of embodiments, be combined and/or share common circuitry. In an embodiment, no circuitry may be common between the transmit and receive functions and the device may be termed as a transmitter-receiver. Other devices consistent with the present disclosure may include transponders, transverters, and/or repeaters, among similar devices. As used herein, the terms "transceiver resource" and "transceiver" are used interchangeably herein and can have the same meaning, as appropriate to the context.

Various wireless communication technologies can be utilized in communicating with different entities (e.g., sever 306, network 308, and/or identity device 304) via the transceiver resource 116. For example, different generations of broadband mobile telecommunication technologies (e.g., first through fifth generation (1-5G)), device-to-device to communication including Bluetooth, Zigbee, 1-5G and/or long-term evolution (LTE) device-to-device communication technologies, and/or other wireless communication utilizing an intermediary device (e.g., WiFi utilizing an access point AP) may be utilized in communicating with different entities.

In some embodiments, the subscriber device 102 can access the identity device (e.g., identity device 302) to wirelessly utilize the data stored in the identity device. As an example, the subscriber device 102 can access data stored in the identity device to further access a network (e.g., network 308) operated by a particular network operator. Further details of accessing the identity device are described in connection with FIG. 3.

Figure 2:
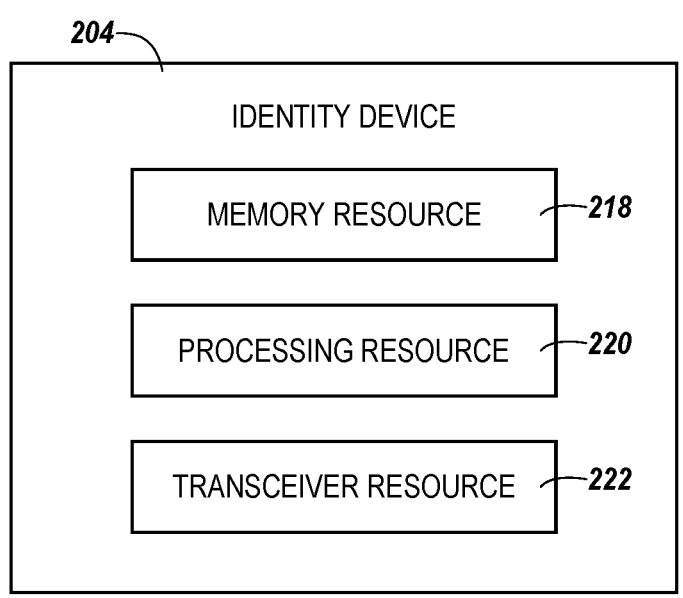
FIG. 2 is a block diagram of an example identity device in accordance with an embodiment of the present disclosure.

FIG. 2 is a block diagram of an example identity device 204 in accordance with an embodiment of the present disclosure. The identity device 204 can be a subscriber identity module (SIM). As used herein, a SIM can refer to a module that stores data (e.g., information) that can be utilized, by a subscriber device, to access a network (e.g., network 108). In one example, the identity device 204 can be implemented as an application on a smart card, such as a universal integrated circuit card (UICC), which can be removably coupled to the subscriber device 102. In another example, the identity device 204 needs not be physically present within and/or removably coupled to the subscriber device 102. In this example, the subscriber device 102 can wirelessly access the identity device 204 via the transceiver resource 116.

The identity device 204 can include a memory resource 218, a processing resource 220, and a transceiver resource 222, as illustrated in FIG. 2. The memory resource 218 (which can be also referred to as "memory") may include memory (e.g., memory cells) arranged, for example, in a number of bank groups, banks, bank sections, subarrays, and/or rows of a number of memory devices. In some embodiments, the memory resource 218 may include a plurality of memory devices such as a number of volatile memory devices formed and/or operable as RAM, DRAM, SRAM, SDRAM, and/or TRAM, among other types of volatile memory devices. In some embodiments, the memory resource 218 may include a number of non-volatile memory devices formed and/or operable as PCRAM, RRAM, FeRAM, MRAM, and/or STT RAM, phase change memory, 3DXPoint, and/or Flash memory devices, among other types of non-volatile memory devices. In some embodiments, the memory resource 218 may include a combination of a number of volatile memory devices and a number of non-volatile memory device, as described herein.

Although not shown in FIG. 2, the memory resource 218 can be coupled to and/or include a controller that can send commands to perform operations on the memory resource 218, including operations to sense (e.g., read), program (e.g., write), move, and/or erase data.

The memory resource 218 can store data corresponding to various types of information such as subscriber information. As used herein, subscriber information can refer to information that can identify and authenticate a particular subscriber device (e.g., subscriber device 102) in a network. As an example, the subscriber information can include an International Mobile Subscriber Identity (IMSI) number (e.g., that identifies a subscriber device in a carrier's network), International Mobile Equipment Identity (IMEI) number, a personal identification number (PIN) (e.g., a code that a subscriber device uses to access an identity device), a personal unblocking code and/or personal unblocking key (PUC/PUK), an authentication key (K/Ki), and/or network state information, for instance, received from a Location Area Identity (LAI) (e.g., information indicating a location of a subscriber device). The memory resource 218 can also store non-subscriber information such as a number of text messages (e.g., short message service (SMS) messages) and/or contact information of a subscriber device.

The processing resource 220 can be coupled to the memory resource 218 and to the transceiver resource 222 and configured to receive data from different entities such as a subscriber device (e.g., subscriber device 102) and/or a network (e.g., network 308) via the transceiver resource 222.

Various wireless communication technologies can be utilized in communicating with different entities (e.g., subscriber device 302 and/or network 308) via the transceiver resource 222. For example, different generations of broadband mobile telecommunication technologies (e.g., 1-5G), device-to-device to communication including Bluetooth, Zigbee, 1-5G and/or LTE device-to-device communication technologies, and/or other wireless communication utilizing an intermediary device (e.g., WiFi utilizing an access point AP) may be utilized in communicating with different entities.

In some embodiments, the identity device 204 can verify a subscriber device, provide a particular key that the subscriber device can utilize to encrypt data, and decrypt the data received from the subscriber device using another key that was generated along with the particular key. Further details of verifying, providing, and decrypting are described in connection with FIG. 3.

Figure 3:
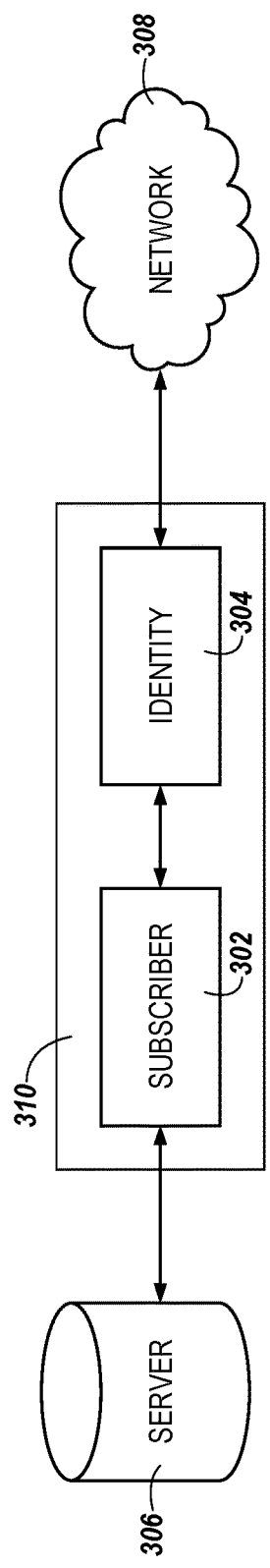
FIG. 3 is a block diagram of an example computing system capable of communicating wirelessly with a server and a network in accordance with an embodiment of the present disclosure.

FIG. 3 is a block diagram of an example computing system 310 capable of communicating wirelessly with a server 306 and a network 308 in accordance with an embodiment of the present disclosure. The subscriber device 302 and the identity device 304 can be, for example, the subscriber device 102 and the identity device 204 previously described in connection with FIGS. 1 and 2, respectively. In one example, the subscriber device 302 may utilize the identity device 304 to access the network 308. In another example, the identity device 304 may be a portion of another subscriber device (e.g., wearable device such as a smart watch) whose SIM (e.g., implemented within the identity device 304) can be activated by the subscriber device 302.

The subscriber device 302 can (e.g., wirelessly) communicate with the server 306. By communicating with the server 306, the subscriber device 302 can obtain data to be stored in the identity device 304 and/or to be utilized for accessing the network 308. As an example, the data that can be obtained from the server 306 may include subscriber information, as described in connection with FIG. 2.

Variety of different technologies can be utilized for initiating the communication with the server 306. For example, a user of the subscriber device 302 may be provided a quick response (QR) code (e.g., from a network operator), which can direct the subscriber device to a server (e.g., server 306) such that, by scanning the QR code by the subscriber device, the user can obtain data from the server. For example, a user of the subscriber device may be directed to log into a particular website that can provide the subscriber information. For example, the subscriber device 302 may be physically coupled to a particular device that transmits the subscriber information to the subscriber device.

Although the server 306 is illustrated as being separate from the network 308, the server 306 can be a portion of the network 308. Accordingly, in some embodiments, the subscriber device 302 may be initially provided an (e.g., limited) access to a carrier's network to access the server 306. For example, the subscriber device 302 may be initially provided a bootstrap SIM and utilize the bootstrap SIM to access the server 306 of the network 308.

The subscriber device 302 can further (e.g., wirelessly) communicate with the identity device 304. For example, content of (e.g., data stored in) the identity device 304 can be modified according to a request of the subscriber device 302. As used herein, an identity device (e.g., SIM) whose content can be modified can be referred to as an embedded SIM (eSIM). As an example, the eSIM can modify the content to add another network operator, switch to a different network operator, and/or delete existing subscriber information corresponding to a particular network operator such that the subscriber device 302 can no longer access the network 308 via the particular network operator. Accordingly, in some embodiments, an eSIM can include a plurality of subscriber information corresponding to a plurality of respective network operators such that the subscriber device 302 can select a network operator among the plurality of network operators to access the network 308.

Communication between the subscriber device 302 and the identity device 304 can be performed in a secure manner. In an embodiment, the subscriber device 302 can receive (e.g., from the server 306) data to be sent to the identity device 304, request the identity device 304 to verify the subscriber device 302 (e.g., handshake), encrypt the data using a secure key received (e.g., upon being verified by the identity device 304) from the identity device 304, and provide the encrypt data to the identity device 304. In an embodiment, the identity device 304 can provide (e.g., in response to verifying the subscriber device 302) a particular key to the subscriber device 302, receive the data encrypted with the particular key previously provided, and decrypt the data using another key that was generated along with the particular key previously provided to the subscriber device 302. Upon successfully decrypting the data received from the subscriber device 302, the identity device 304 can store the decrypted data such that the subscriber device 302 can access the identity device 304 to access the network 308 via the decrypted data. Further details of exchanging keys and data between the subscriber device 302 and the identity device 304 are described below.

Figure 4:
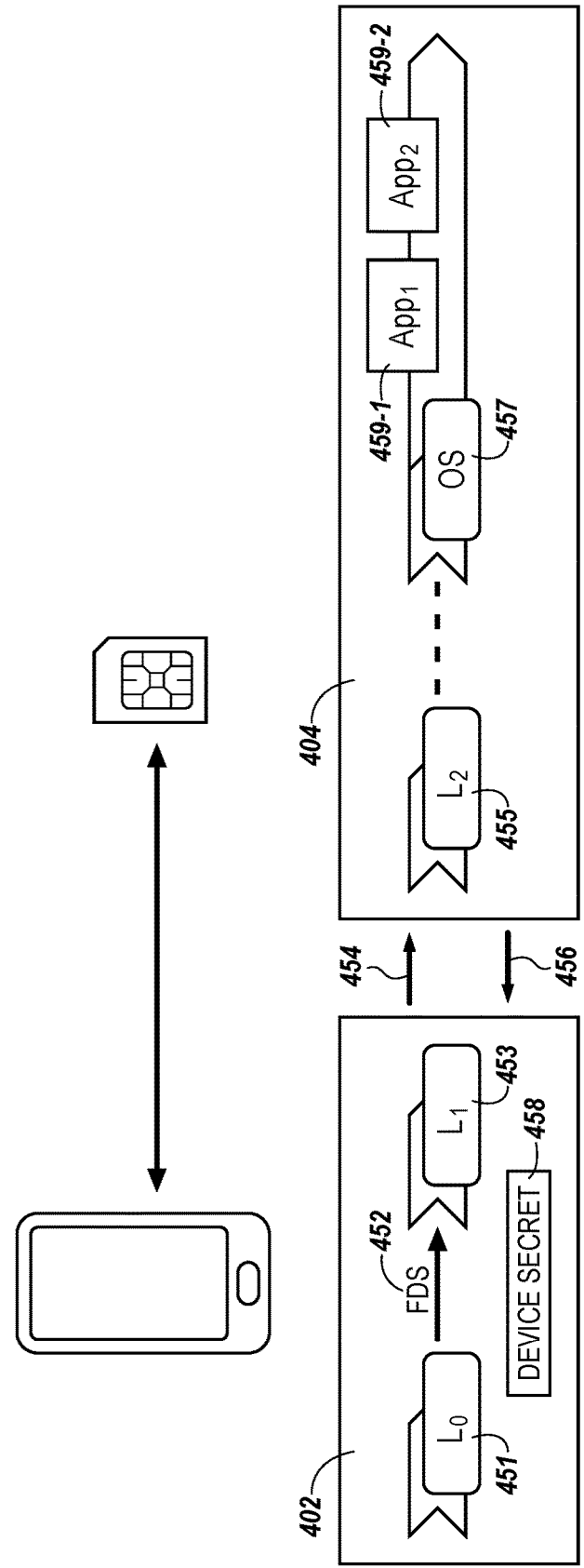
FIG. 4 is a block diagram of an example system including a subscriber device and an identity device in accordance with an embodiment of the present disclosure.

FIG. 4 is a block diagram of an example system including a subscriber device 402 and an identity device 404 in accordance with an embodiment of the present disclosure. The subscriber device 402 and the identity device 404 can be, for example, subscriber device 102 and identity device 204, respectively, previously described in connection with FIGS. 1 and 2. As an example, the identity device 404 may be an eSIM of a wearable device (e.g., smart watch), which differs from the subscriber device 402. In this example, the subscriber device 402 may be configured to activate the eSIM of the wearable device wirelessly such that the wearable device can access a network (e.g., network 108) via the activated eSIM.

A computing device can boot in stages using layers, with each layer authenticating and loading a subsequent layer and providing increasingly sophisticated runtime services at each layer. A layer can be served by a prior layer and serve a subsequent layer, thereby creating an interconnected web of the layers that builds upon lower layers and serves higher order layers. In the embodiment illustrated in FIG. 5, Layer 0 ("$L_0$") 451 and Layer 1 ("$L_1$") 453 are within the subscriber device 402. Layer 0 451 can provide a Firmware Derivative Secret (FDS) key 452 to Layer 1 453. The FDS key 452 can describe the identity of code of Layer 1 453 and other security relevant data. In an example, a particular protocol (such as robust internet of things (RIOT) core protocol) can use the FDS 452 to validate code of Layer 1 546 that it loads. In an example, the particular protocol can include a device identification composition engine (DICE) and/or the RIOT core protocol. As an example, an FDS can include Layer 1 firmware image itself, a manifest that cryptographically identifies authorized Layer 1 firmware, a firmware version number of signed firmware in the context of a secure boot implementation, and/or security-critical configuration settings for the device.

A device secret 458 can be used to create the FDS 452 and be stored in memory of the subscriber device 402. In some embodiments, the device secret 458 can be received from a server (e.g., server 106) that is operated by a particular network operator. In an example operation, the subscriber device 402 can read the device secret 458, hash an identity of Layer 1 453, and perform a calculation including:

$$K_{L1}=KDF[Fs(s), Hash(\text{"immutable information"})]$$

where $K_{L1}$ is a public key, KDF (e.g., KDF defined in the National Institute of Standards and Technology (NIST) Special Publication 800-108) is a key derivation function (i.e., HMAC-SHA256), and Fs(s) is the device secret 458. FDS 452 can be determined by performing:

$$FDS=HMAC\text{-}SHA256[Fs(s), SHA256(\text{"immutable information"})]$$

The subscriber device 402 can transmit data, as illustrated by arrow 454, to the identity device 404. As an example, prior to the subscriber device 402 being verified by the identity device 404, the transmitted data can include a subscriber identification that is public, a certificate (e.g., a subscriber identification certificate), and/or a subscriber public key. As an example, subsequent to the subscriber device 402 being verified by the identity device 404, the transmitted data can include data to be stored in the identity device 404, such as data corresponding to subscriber information (e.g., as described in connection with FIG. 2), contact information, and/or text messages of the subscriber device 402.

Layer 2 ("$L_2$") 455 of the identity device 404 can receive the transmitted data, and execute the data in operations of the operating system ("OS") 457 and on a first application 459-1 and a second application 459-2. The identity device 404 can also transmit data, as illustrated by arrow 456, to the subscriber device 402.

In some embodiments, data to be stored in the identity device 404 (e.g., subscriber information, contact information, and/or text messages) may also be received simultaneously along with the subscriber public identification, subscriber identification certificate, and/or subscriber public key that are received for verifying the subscriber device 402. In this example, the data may be allowed to be stored in the identity device 404 when the subscriber device 402 is verified, while may be discarded when the subscriber device 402 is not verified by the identity device 404. Further details of verifying a device (e.g., subscriber device 402 and/or an identity device 404) is described in connection with FIG. 6.

Figure 5:
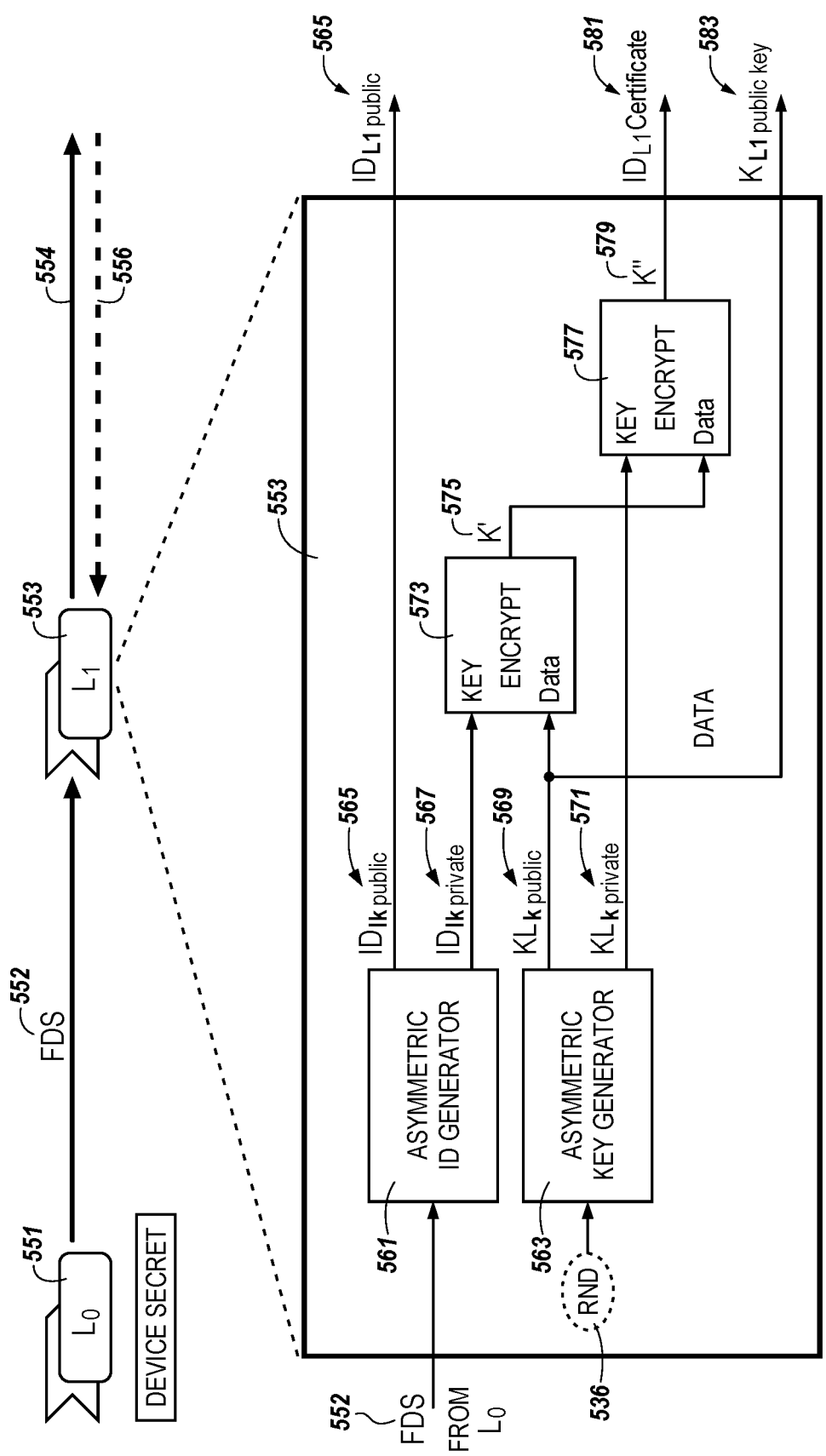
FIG. 5 is a block diagram of an example process to determine a number of parameters in accordance with an embodiment of the present disclosure.

FIG. 5 is a block diagram of an example process to determine a number of parameters in accordance with an embodiment of the present disclosure. FIG. 5 is an example of a determination of the parameters including a public identification (e.g., 565), a certificate (e.g., 581), and a public key (e.g., 583) that are then sent, indicated by arrow 554, to Layer 2 (e.g., Layer 2 455) of an identity device (e.g., 404 in FIG. 4). As used herein, a public identification, a certificate, and a public key that are generated from the subscriber device 402 can be referred to as a subscriber public identification, a subscriber certificate, and a subscriber public key, respectively. Layer 0 ("$L_0$") 551 in FIG. 5 corresponds to Layer 0 451 in FIG. 4 and likewise FDS 552 corresponds to FDS 452, Layer 1 553 corresponds to Layer 1 453, and arrows 554 and 556 correspond to arrows 454 and 456, respectively.

The FDS 552 from Layer 0 551 is sent to Layer 1 553 and used by an asymmetric ID generator 561 to generate a public identification ("$ID_{lk\ public}$") 565 and a private identification 567. In the abbreviated "$ID_{lk\ public}$," the "lk" indicates Layer k (in this example Layer 1), and the "public" indicates that the identification is openly shared. The public identification 565 is illustrated as shared by the arrow extending to the right and outside of Layer 1 553 of a subscriber device (e.g., subscriber device 402). The generated private identification 567 is used as a key input into an encryptor 573. The encryptor 573 can be any processor, computing device, etc. used to encrypt data.

Layer 1 553 of a subscriber device can include an asymmetric key generator 563. In at least one example, a random number generator (RND) 536 can optionally input a random number into the asymmetric key generator 563. The asymmetric key generator 563 can generate a subscriber public key ("$K_{Lk\ public}$") 569 and a subscriber private key ("$K_{LK\ private}$") 571 associated with a subscriber device such as subscriber device 402 in FIG. 4. The subscriber public key 569 can be an input (as "data") into the encryptor 573. The encryptor 573 can generate a result K' 575 using the inputs of the subscriber private identification 567 and the subscriber public key 569. The subscriber private key 571 and the result K' 575 can be input into an additional encryptor 577, resulting in output K" 579. The output K" 579 is the certificate ("$ID_{L1}$ certificate") 581 transmitted to the Layer 2 (455 of FIG. 4). The subscriber certificate 581 can provide an ability to verify and/or authenticate an origin of data sent from a device. As an example, data sent from the subscriber device can be associated with an identity of the subscriber device by verifying the certificate, as will be described further in association with FIG. 6. Further, the subscriber public key ("$K_{L1\ public\ key}$") 583 can be transmitted to Layer 2. Therefore, the public identification 565, the certificate 581, and the public key 583 of a subscriber device can be transmitted to Layer 2 of an identity device.

Figure 6:
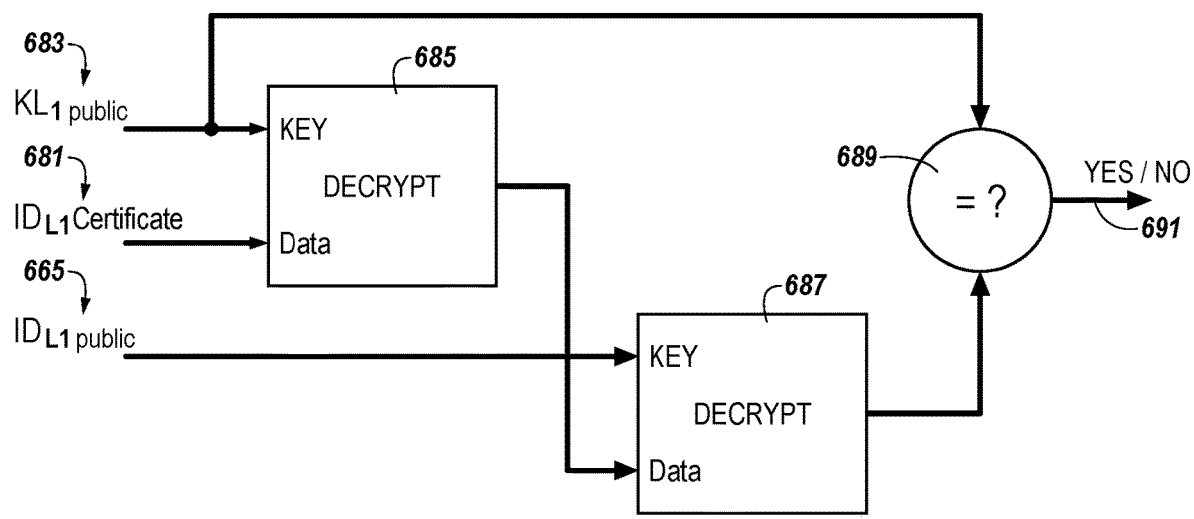
FIG. 6 is a block diagram of an example process to verify a certificate in accordance with an embodiment of the present disclosure.

FIG. 6 is a block diagram of an example process to verify a certificate in accordance with an embodiment of the present disclosure. In the illustrated example of FIG. 6, a public key 683, a certificate 681, and a public identification 665 is provided from a subscriber device (e.g., from Layer 1 453 of subscriber device 402 in FIG. 4). The data of the certificate 681 and the public key 683 can be used as inputs into a decryptor 685. The decryptor 685 can be any processor, computing device, etc used to decrypt data. The result of the decryption of the certificate 681 and the public key 683 can be used as an input into a secondary decryptor 687 along with the public identification, result in an output. The public key 683 and the output from the decryptor 687 can indicate, as illustrated at 689, whether the certificate 681 is verified, resulting in a yes or no 691 as an output.

In response to the certificate 681 being verified, data may be further exchanged between the subscriber device and the identity device. In one example, in response to the subscriber device being verified, a public key, a certificate, and a public identification generated at the identity device can be provided back to the subscriber device. In another example, in response to the subscriber device being verified, the subscriber device can further provide data to be stored in the identity device and the data can be accepted, decrypted, and processed. However, in response to the certificate not being verified, data received from the device being verified can be discarded, removed, and/or ignored and/or further data exchanged between two can be prohibited. In this way, nefarious devices sending nefarious data can be detected and avoided. As an example, a hacker sending data to be processed can be identified and the hacking data not processed. Further details of data exchange subsequent to a verification is described in connection with FIG. 7

Figure 7:
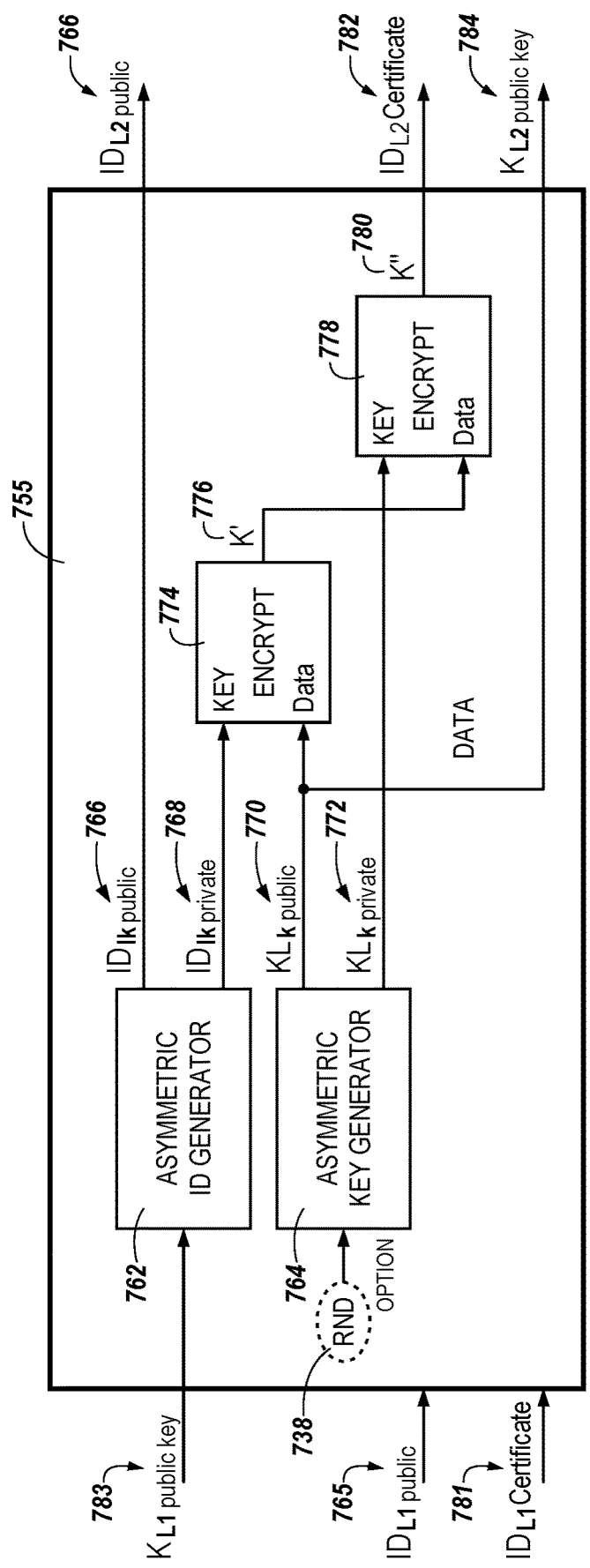
FIG. 7 is a block diagram of an example process to determine a number of parameters in accordance with an embodiment of the present disclosure.

FIG. 7 is a block diagram of an example process to determine a number of parameters in accordance with an embodiment of the present disclosure. FIG. 7 illustrates a Layer 2 755 of an identity device (e.g., identity device 404 in FIG. 4) generating a identification ("$ID_{L2}$ public") 766, a certificate ("$ID_{L2}$ Certificate") 782, and a public key ("$K_{L2\ public\ key}$") 784. As used herein, a public identification, a certificate, and a public key that are generated at the identity device (e.g., identity device 404) can be referred to as an identity public identification, an identity certificate, and an identity public key, respectively.

The subscriber public key ("$K_{L1\ public\ key}$") 783 transmitted from Layer 1 of the subscriber device to Layer 2 755 of an identity device, as described in FIG. 5, is used by an asymmetric ID generator 762 of the identity device to generate a public identification ("$ID_{lk\ public}$") 766 and a private identification 768 of the identity device. In the abbreviated "$ID_{lk\ public}$," the "lk" indicates Layer k (in this example Layer 2), and the "public" indicates that the identification is openly shared. The public identification 766 is illustrated as shared by the arrow extending to the right and outside Layer 2 755. The generated private identification 768 is used as a key input into an encryptor 774.

Layer 2 755 of the identity device can include an asymmetric key generator 764. In at least one example, a random number generator (RND) 738 can optionally input a random number into the asymmetric key generator 764. The asymmetric key generator 764 can generate a public key ("$K_{Lk\ public}$") 770 and a private key ("$K_{LK\ private}$") 772 associated with a identity device such as identity device 406 in FIG. 4. The identity public key 770 can be an input (as "data") into the encryptor 774. The encryptor 774 can generate a result K' 776 using the inputs of the identity private identification 768 and the identity public key 770. The identity private key 772 and the result K' 776 can be input into an additional encryptor 778, resulting in output K" 780. The output K" 780 is the identity certificate ("$ID_{L2}$ certificate") 782 transmitted back to the Layer 1 (453 of FIG. 4). The identity certificate 782 can provide an ability to verify and/or authenticate an origin of data sent from a device. As an example, data sent from the identity device can be associated with an identity of the identity device by verifying the certificate, as will be described further in association with FIG. 7. Further, the identity public key ("$K_{L2\ public\ key}$") 784 can be transmitted to Layer 1. Therefore, the public identification 766, the certificate 782, and the public key 784 of the identity device can be transmitted to Layer 1 of a subscriber device.

In an example, in response to a subscriber device receiving a public key from an identity device, the subscriber device can encrypt data to be sent to the identity device using the identity public key. Vice versa, the identity device can encrypt data to be sent to the subscriber device using the subscriber public key. In response to the identity device receiving data encrypted using the identity public key, the identity device can decrypt the data using its own private key (e.g., identity private key). Likewise, in response to the subscriber device receiving data encrypted using the subscriber public key, the subscriber device can decrypt the data using its own private key (e.g., subscriber private key). As the identity private key is not shared with another device outside the identity device and the subscriber private key is not shared with another device outside the subscriber device, the data sent to the identity device and the subscriber device remains secure.

In an embodiment, a first entity that initially requests a handshake with a second entity may generate a first public key, a first public identification, and a first certificate based on a device secret of its own. On the other hand, the second entity that received a request to handshake may generate a second public key, a second public identification, and a second certificate based on the first public key provided by the first entity. For example, the embodiment illustrated in FIGS. 4, 5, and 7 illustrates a subscriber device (e.g., subscriber device 402) as an entity initially requesting a handshake with an identity device (e.g., identity device 404). In this embodiment, the subscriber device generates a public key (e.g., public key 583), public identification (e.g., public identification 565), and a certificate (e.g., certificate 581) based on a device secret of the subscriber device (e.g., provided from a network operator), and the identity device generates those based on the public key provided from the subscriber device. However, embodiments are not so limited. For example, the identity device may initially request a handshake with the subscriber device such that the identity device generates a public key, public identification, and a certificate using its own device secret, while the subscriber device generates those based on the public key provided from the identity device.

Figure 8:
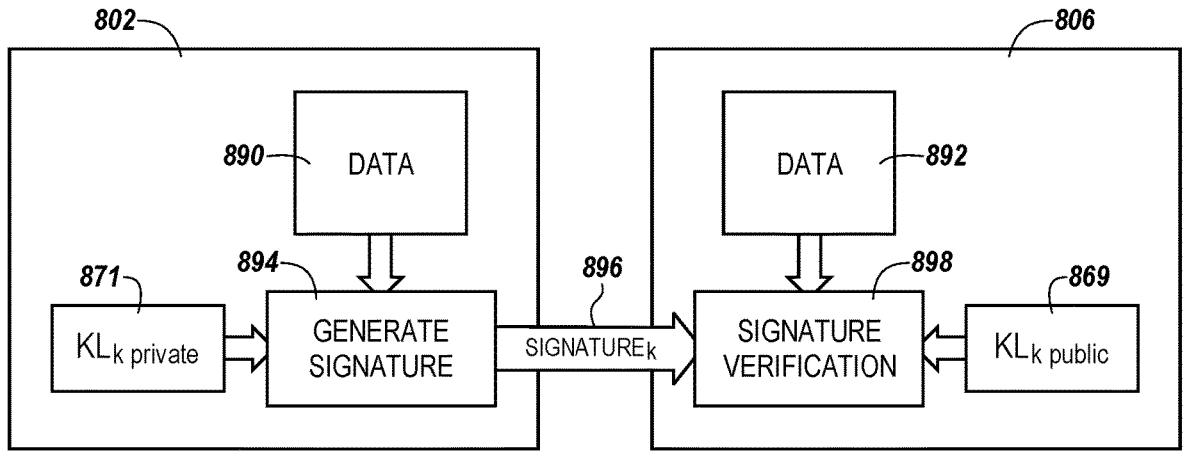
FIG. 8 is a block diagram of an example process to verify a signature in accordance with an embodiment of the present disclosure.

FIG. 8 is a block diagram of an example process to verify a signature in accordance with an embodiment of the present disclosure. In the instance where a device is sending data that may be verified in order to avoid subsequent repudiation, a signature can be generated and sent with data. As an example, a first device may make a request of a second device and once the second device performs the request, the first device may indicate that the first device never made such a request. An anti-repudiation approach, such as using a signature, can avoid repudiation by the first device and insure that the second device can perform the requested task without subsequent difficulty.

A subscriber device 802 (such as subscriber device 102 in FIG. 1) can send data 890 to an identity device 804 (such as identity device 204 in FIG. 2). The subscriber device 802 can generate, at 894, a signature 896 using a device private key 871. The signature 896 can be transmitted to the identity device 804. The identity device 804 can verify, at 898, the signature using data 892 and the subscriber public key 869 previously received. In this way, the signature is generated using a private key and verified using a public key. In this way, a unique signature for each device can remain private to the device sending the signature while allowing the receiving device to be able to decrypt the signature for verification. This is in contrast to encryption/decryption of the data, which is encrypted by the sending device using the public key of the receiving device and decrypted by the receiving device using the private key of the receiver. In at least one example, the device can verify the digital signature by using an internal cryptography process (e.g., Elliptical Curve Digital signature (ECDSA) or a similar process.

Figure 9:
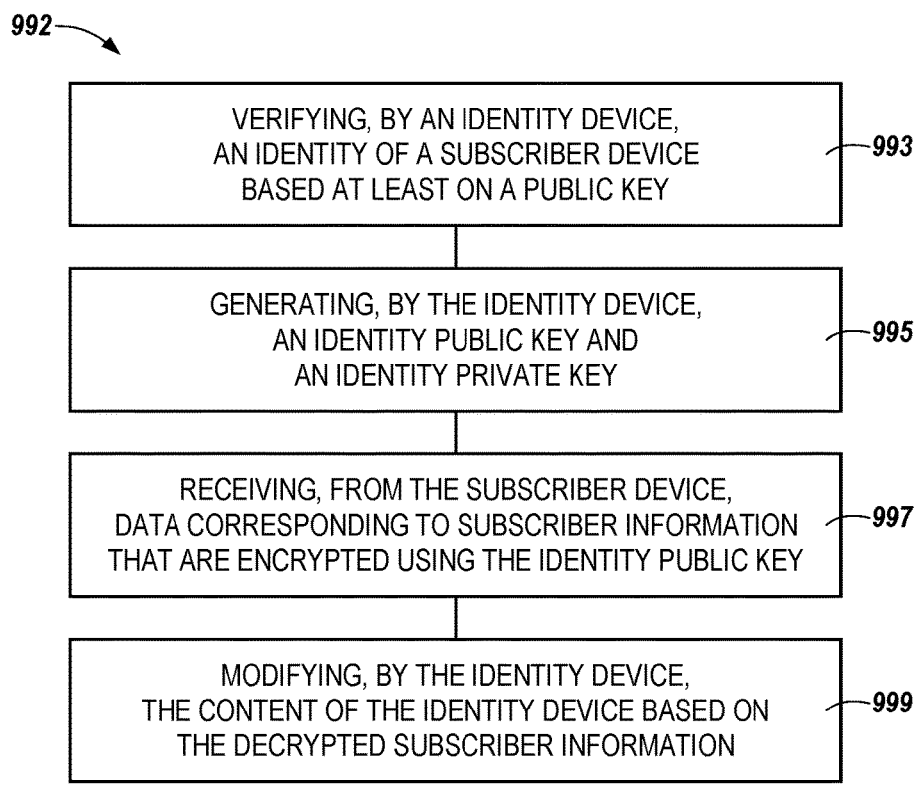
FIG. 9 illustrates a flow chart illustrating an example method for accessing a network in accordance with an embodiment of the present disclosure.

FIG. 9 illustrates a flow chart illustrating an example method 992 for accessing a network in accordance with an embodiment of the present disclosure. At block 993, the method 992 can include verifying (e.g., by an identity device) an identity of a subscriber device based at least on a subscriber public key. The subscriber device can be verified when the identity device receives (e.g., from the subscriber device) a request to modify content of the identity device. Along with the request, the subscriber public key can also be received from the subscriber device. The subscriber device and the identity device can be, for example, subscriber device 302 and identity device 304, as previously described in connection with FIG. 3.

At block 995, the method 992 can include generating (e.g., by the identity device) an identity public key and an identity private key. The identity public key and the identity private key may be generated when the subscriber device is verified by the identity device. Otherwise, the identity device may not generate those, and prohibit data to be received from the subscriber device and/or discard data received form the subscriber device. The identity public key may be provided to the subscriber device such that the subscriber device can encrypt data to be sent to the identity device using the identity public key.

At block 997, the method 992 can include receiving (e.g., at the identity device) data corresponding to subscriber information that are encrypted using the identity public key. The encrypted data may be further decrypted at the identity device, for example, using the identity private key that was generated along with the identity public key previously provided to the subscriber device. Encrypting and decrypting the data can be performed using a DICE-RIOT protocol At block 999, the method 992 can include modifying the content of the identity device based on the decrypted subscriber information. As described herein, the decrypted subscriber information may be accessed by the subscriber device to further access a network operated by a particular operator.

Figure 10:
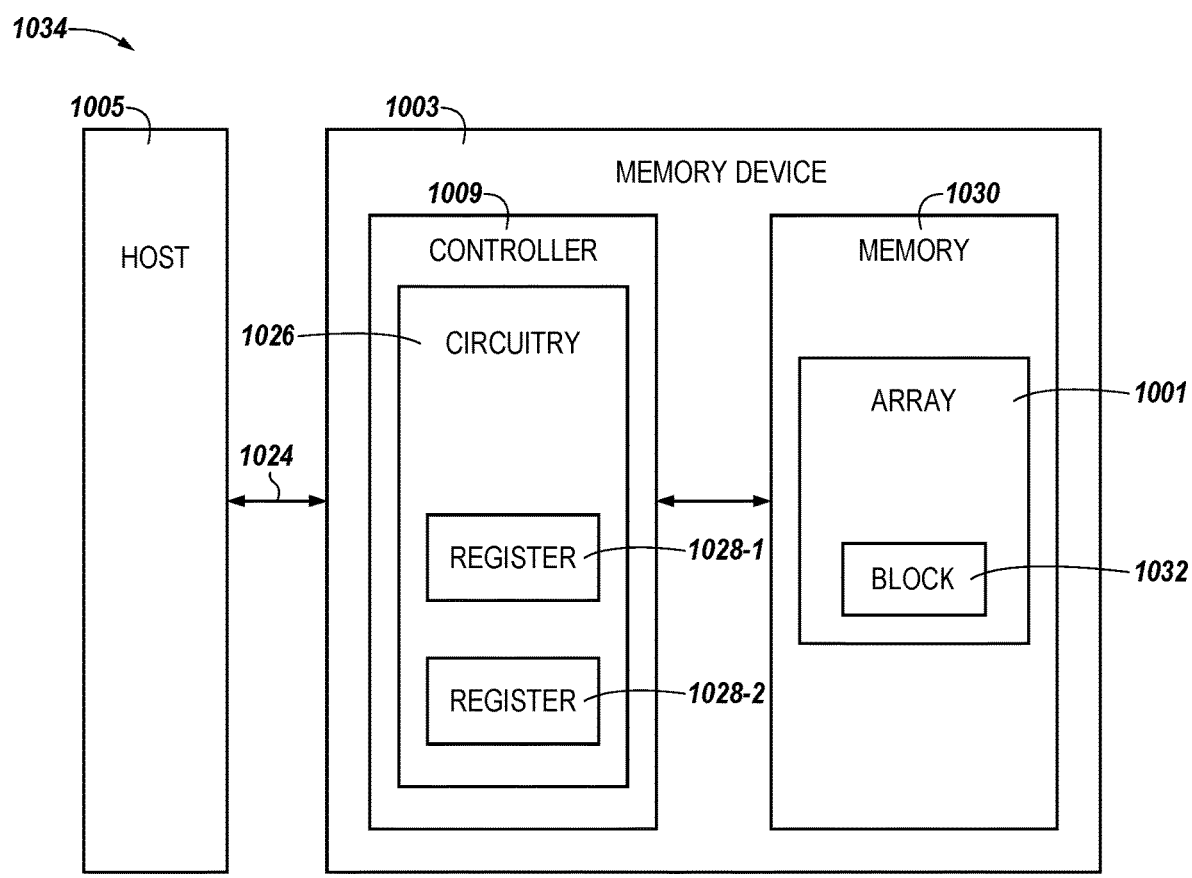
FIG. 10 is a block diagram of a computing system including a host and an apparatus in the form of a memory device in accordance with an embodiment of the present disclosure.

FIG. 10 is a block diagram of a computing system 1034 including a host 1005 and an apparatus in the form of a memory device 1003 in accordance with an embodiment of the present disclosure. In an example, the host 1005 and the memory device 1003 can be a subscriber device 102 and an identity device 204, as previously described in connection with FIGS. 1 and 2, respectively. As used herein, an "apparatus" can refer to, but is not limited to, any of a variety of structures or combinations of structures, such as a circuit or circuitry, a die or dice, a module or modules, a device or devices, or a system or systems, for example. Further, in an embodiment, computing system 1034 can include a number of memory devices analogous to memory device 1003.

In the embodiment illustrated in FIG. 10, memory device 1003 can include a memory 1030 having a memory array 1001. Memory array 1001 can be analogous to memory resources 112 and/or 218 previously described in connection with FIGS. 1 and 2, respectively. Further, memory array 1001 can be a secure array, as will be further described herein. Although one memory array 1001 is illustrated in FIG. 10, memory 1030 can include any number of memory arrays analogous to memory array 1001.

As illustrated in FIG. 10, host 1005 can be coupled to the memory device 1003 via interface 1024. Host 1005 and memory device 1003 can communicate (e.g., send commands and/or data) on interface 1024. Host 1005 and/or memory device 1003 can be, or be part of, a laptop computer, personal computer, digital camera, digital recording and playback device, mobile telephone, PDA, memory card reader, interface hub, or Internet of Things (IoT) enabled device, such as, for instance, an automotive (e.g., vehicular and/or transportation infrastructure) IoT enabled device or a medical (e.g., implantable and/or health monitoring) IoT enabled device, among other host systems, and can include a memory access device (e.g., a processor). One of ordinary skill in the art will appreciate that "a processor" can intend one or more processors, such as a parallel processing system, a number of coprocessors, etc.

In some embodiments, interface 1024 can be in the form of a standardized physical interface. For example, when memory device 1003 is used for information storage in computing system 1034, interface 1024 can be a serial advanced technology attachment (SATA) physical interface, a peripheral component interconnect express (PCIe) physical interface, a universal serial bus (USB) physical interface, or a small computer system interface (SCSI), among other physical connectors and/or interfaces. In general, however, interface 1024 can provide an interface for passing control, address, information (e.g., data), and other signals between memory device 1003 and a host (e.g., host 1005) having compatible receptors for interface 1024.

In some embodiments, interface 1024 can be utilized for a wireless communication technology, such as different generations of broadband mobile telecommunication technologies (e.g., 1-5G), device-to-device to communication including Bluetooth, Zigbee, 1-5G and/or long-term evolution (LTE) device-to-device communication technologies, and/or other wireless communication utilizing an intermediary device (e.g., WiFi utilizing an access point AP) may be utilized in communicating with different entities, as described in connection with FIGS. 1 and 2.

Memory device 1003 includes controller 1009 to communicate with host 1005 and with memory 1030 (e.g., memory array 1001). For instance, controller 1009 can send commands to perform operations on memory array 1001, including operations to sense (e.g., read), program (e.g., write), move, and/or erase data, among other operations.

Controller 1009 can be included on the same physical device (e.g., the same die) as memory 1030. Alternatively, controller 1009 can be included on a separate physical device that is communicatively coupled to the physical device that includes memory 1030. In an embodiment, components of controller 1009 can be spread across multiple physical devices (e.g., some components on the same die as the memory, and some components on a different die, module, or board) as a distributed controller.

Host 1005 can include a host controller (not shown FIG. 10) to communicate with memory device 1003. The host controller can send commands to memory device 1003 via interface 1024. The host controller can communicate with memory device 1003 and/or the controller 1009 on the memory device 1003 to read, write, and/or erase data, among other operations. Further, in an embodiment, host 1005 can be an IoT enabled device, as previously described herein, having IoT communication capabilities.

Controller 1009 on memory device 1003 and/or the host controller on host 1005 can include control circuitry and/or logic (e.g., hardware and firmware). In an embodiment, controller 1009 on memory device 1003 and/or the host controller on host 1005 can be an application specific integrated circuit (ASIC) coupled to a printed circuit board including a physical interface. Also, memory device 1003 and/or host 1005 can include a buffer of volatile and/or non-volatile memory and a number of registers.

For example, as shown in FIG. 10, memory device can include circuitry 1026. In the embodiment illustrated in FIG. 10, circuitry 1026 is included in controller 1009. However, embodiments of the present disclosure are not so limited. For instance, in an embodiment, circuitry 1026 may be included in (e.g., on the same die as) memory 1030 (e.g., instead of in controller 1009). Circuitry 1026 can comprise, for instance, hardware, firmware, and/or software.

Circuitry 1026 can generate a block 1032 in a block chain for validating (e.g., authenticating and/or attesting) the data stored in memory 1030 (e.g., in memory array 1001). The block 1032 can include a cryptographic hash of (e.g., a link to) the previous block in the block chain, and a cryptographic hash of (e.g., identifying) the data stored in memory array 1001. The block 1032 can also include a header having a timestamp indicating when the block was generated. Further, the block 1032 can have a digital signature associated therewith that indicates the block is included in the block chain.

The cryptographic hash of the data stored in memory array 1001, and/or the cryptographic hash of the previous block in the block chain, can comprise, for instance, a SHA-256 cryptographic hash. Further, the cryptographic hash of the data stored in memory array 1001, and the cryptographic hash of the previous block in the block chain, can each respectively comprise 256 bytes of data.

The cryptographic hash of the data stored in memory array 1001 can be generated (e.g., calculated), for example, by circuitry 1026. In such an example, the cryptographic hash of the data stored can be internally generated by memory device 1003 without having external data moving on interface 1024. As an additional example, the cryptographic hash of the data can be communicated from an external entity. For instance, host 1005 can generate the cryptographic hash of the data stored in memory array 1001, and send the generated cryptographic hash to memory device 1003 (e.g., circuitry 1026 can receive the cryptographic hash of the data stored in memory array 1001 from host 1005).

The digital signature associated with the block 1032 can be generated (e.g., calculated), for example, by circuitry 1026 based on (e.g., responsive to) an external command, such as a command received from host 1005. For instance, the digital signature can be generated using symmetric or asymmetric cryptography. As an additional example, host 1005 can generate the digital signature, and send (e.g. provide) the generated digital signature to memory device 1003 (e.g., circuitry 1026 can receive the digital signature from host 1005).

As shown in FIG. 10, the block 1032, as well as the digital signature associated with block 1032, can be stored in memory array 1001. For example, the block 1032 can be stored in a portion of memory array 1001 that is inaccessible to a user of memory device 1003 and/or host 1005 (e.g., in a "hidden" region of memory array 1001). Storing the block 1032 in memory array 1001 can simplify the storage of the block by, for example, removing the need for software storage management for the block.

In an embodiment, memory array 1001 (e.g., a subset of array 1001, or the whole array 1001) can be a secure array (e.g., an area of memory 1030 to be kept under control). For example, the data stored in memory array 1001 can include sensitive (e.g., non-user) data, such as host firmware and/or code to be executed for sensitive applications. In such an embodiment, a pair of non-volatile registers can be used to define the secure array. For example, in the embodiment illustrated in FIG. 10, circuitry 1026 includes registers 1028-1 and 1028-2 that can be used to define the secure array. For instance, register 1028-1 can define the address (e.g., the starting LBA of the data) of the secure array, and register 1028-2 can define the size (e.g., the ending LBA of the data) of the secure array. Once the secure array has been defined, circuitry 1026 can generate (e.g., calculate) a cryptographic hash associated with the secure array, which may be referred to herein as a golden hash, using authenticated and antireplay protected commands (e.g., so that only memory device 1003 knows the golden hash, and only memory device 1003 is capable of generating and updating it). The golden hash may be stored in inaccessible portion of memory array 1001 (e.g., the same inaccessible portion in which block 1032 is stored), and can be used during the process of validating the data of the secure array.

Memory device 1003 (e.g., circuitry 1026) can send, via interface 1024, the block 1032, along with the digital signature associated with block 1032, to host 1005 for validation of the data stored in memory array 1001. For example, circuitry 1026 can sense (e.g., read) the block 1032 stored in memory array 1001, and send the sensed block to host 1005 for validation of the data stored in array 1001, responsive to a powering (e.g., a powering on and/or powering up) of memory device 1003. As such, a validation of the data stored in memory array 1001 can be initiated (e.g., automatically) upon the powering of memory device 1003.

As an additional example, circuitry 1026 can send the block 1032, along with the digital signature associated with block 1032, to host 1005 upon an external entity, such as host 1005, initiating a validation of the data stored in memory array 1001. For instance, host 1005 can send a command to memory device 1003 (e.g., circuitry 1026) to sense the block 1032, and circuitry 1026 can execute the command to sense the block 1032, and send the sensed block to host 1005 for validation of the data stored in array 1001, responsive to receipt of the command.

Upon receiving the block 1032, host 1005 can validate (e.g., determine whether to validate) the data stored in memory array 1001 using the received block. For example, host 1005 can use the cryptographic hash of the previous block in the block chain and the cryptographic hash of the data stored in memory array 1001 to validate the data. Further, host 1005 can validate the digital signature associated with the block 1032 to determine the block is included (e.g., is eligible to be included) in the block chain. As used herein, validating the data stored in memory array 1001 can include, and/or refer to, authenticating and/or attesting that the data is genuine (e.g., is the same as originally programmed), and has not been altered by hacking activity or other unauthorized changes.

In embodiments in which memory array 1001 is a secure array, the golden hash previously described herein may also be used to validate the data stored in memory array 1001. For example, a run-time cryptographic hash can be generated (e.g., calculated), and compared with the golden hash. If the comparison indicates the run-time and golden hashes match, it can be determined that the secure array has not been altered, and therefore the data stored therein is valid. If, however, the comparison indicates the run-time and golden hashes do not match, this may indicate that the data stored in the secure array has been changed (e.g., due to a hacker or a fault in the memory), and this can be reported to host 1005.

After the validation of the data stored in memory array 1001, circuitry 1026 can generate an additional (e.g., the next) block in the block chain for validating the data stored in memory array 1001, in a manner analogous to which the block 1032 was generated. For example, this additional block can include a cryptographic hash of block 1032, which has now become the previous block in the block chain, and a new cryptographic hash of the data stored in memory array 1001. Further, this additional block can include a header having a timestamp indicating when this block was generated, and can have a digital signature associated therewith that indicates this block is included in the block chain. Further, in embodiments in which memory array 1001 is a secure array, an additional (e.g., new) golden hash can be generated.

The additional block, as well as the digital signature associated with the additional block, and the additional golden hash, can be stored in memory array 1001. For example, the additional block can replace block 1032 (e.g., the previous block) in memory array 1001. The additional block, digital signature, and additional golden hash can then be used by host 1005 to validate the data stored in memory array 1001, in a manner analogous to that previously described herein for block 1032. Additional blocks in the block chain can continue to be generated by circuitry 1026, and used by host 1005 to validate the data stored in memory array 1001, in such manner throughout the lifetime of memory device 1003.

The embodiment illustrated in FIG. 10 can include additional circuitry, logic, and/or components not illustrated so as not to obscure embodiments of the present disclosure. For example, memory device 1003 can include address circuitry to latch address signals provided over I/O connectors through I/O circuitry. Address signals can be received and decoded by a row decoder and a column decoder, to access memory array 1001. Further, memory device 1003 can include a main memory, such as, for instance, a DRAM or SDRAM, that is separate from and/or in addition to memory array 1001. An example further illustrating additional circuitry, logic, and/or components of memory device 1003 will be further described herein (e.g., in connection with FIG. 11).

Figure 11:
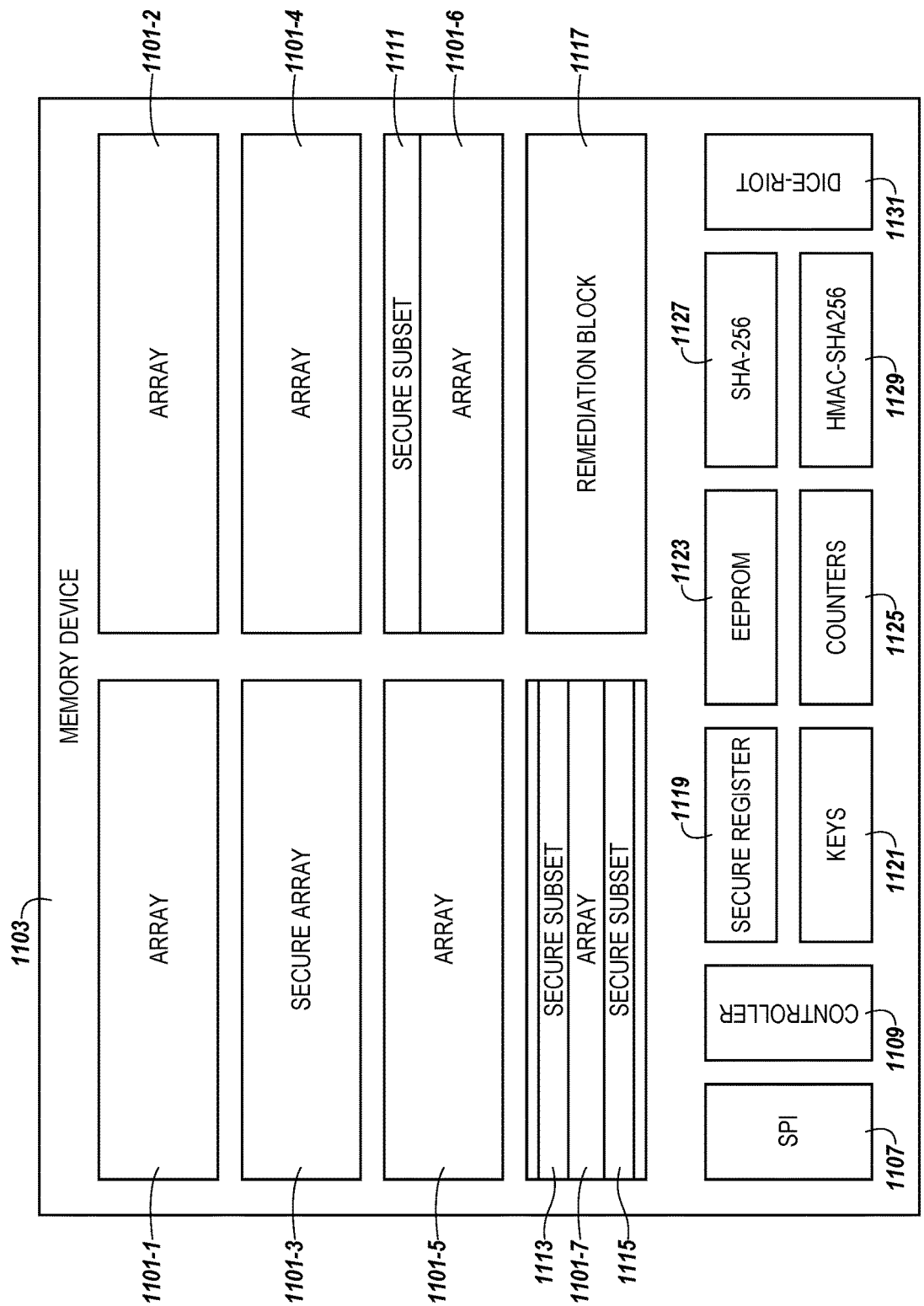
FIG. 11 is a block diagram of an example memory device in accordance with an embodiment of the present disclosure.

FIG. 11 is a block diagram of an example memory device 1103 in accordance with an embodiment of the present disclosure. Memory device 1103 can be, for example, a subscriber device 102 or an identity device 206, as described in connection with FIGS. 1 and 2, respectively.

As shown in FIG. 11, memory device 1103 can include a number of memory arrays 1101-1 through 1101-7. Further, in the example illustrated in FIG. 11, memory array 1101-3 is a secure array, subset 1111 of memory array 1101-6 comprises a secure array, and subsets 1113 and 1115 of memory array 1101-7 comprise a secure array. Subsets 1111, 1113, and 1115 can each include, for instance, 4 kilobytes of data. However, embodiments of the present disclosure are not limited to a particular number or arrangement of memory arrays or secure arrays.

As shown in FIG. 11, memory device 1103 can include a remediation (e.g., recovery) block 1117. Remediation block 1117 can be used as a source of data in case of errors (e.g., mismatches) that may occur during operation of memory device 1103. Remediation block 1117 may be outside of the area of memory device 1103 that is addressable by a host.

As shown in FIG. 11, memory device 1103 can include a serial peripheral interface (SPI) 1107 and a controller 1109. Memory device 1103 can use SPI 1107 and controller 1109 to communicate with a host and memory arrays 1101-1 through 1101-7.

As shown in FIG. 11, memory device 1103 can include a secure register 1119 for managing the security of memory device 1103. For example, secure register 1119 can configure, and communicate externally, to an application controller. Further, secure register 1119 may be modifiable by an authentication command.

As shown in FIG. 11, memory device 1103 can include keys 1121. For instance, memory device 1103 can include eight different slots to store keys such as root keys, DICE-RIOT keys, and/or other external session keys.

As shown in FIG. 11, memory device 1103 can include an electronically erasable programmable read-only memory (EEPROM) 1123. EEPROM 1123 can provide a secure non-volatile area available for a host, in which individual bytes of data can be erased and programmed.

As shown in FIG. 11, memory device 1103 can include counters (e.g., monotonic counters) 1125. For instance, memory device 1103 can include six different monotonic counters, two of which may be used by memory device 1103 for authenticated commands, and four of which may be used by the host.

As shown in FIG. 11, memory device 1103 can include an SHA-256 cryptographic hash function 1127, and/or an HMAC-SHA256 cryptographic hash function 1129. SHA-256 and/or HMAC-SHA256 cryptographic hash functions 1127 and 1129 can be used by memory device 1103 to generate cryptographic hashes, such as, for instance, the cryptographic hash of a command as previously described herein, and/or a golden hash used to validate data stored in memory arrays 1101-1 through 1101-7. Further, memory device 1103 can support L0 and L1 of DICE-RIOT 1131.

In the preceding detailed description, reference is made to the accompanying drawings that form a part hereof, and in which is shown, by way of illustration, specific examples. In the drawings, like numerals describe substantially similar components throughout the several views. Other examples may be utilized, and structural, logical and/or electrical changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure and should not be taken in a limiting sense.

As used herein, "a," "an," or "a number of" something can refer to one or more of such things. A "plurality" of something intends two or more. As used herein, the term "coupled" may include electrically coupled, directly coupled, and/or directly connected with no intervening elements (e.g., by direct physical contact) or indirectly coupled and/or connected with intervening elements. The term coupled may further include two or more elements that co-operate or interact with each other (e.g., as in a cause and effect relationship).

Although specific examples have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. The scope of one or more examples of the present disclosure should be determined with reference to the appended claims, along with the full range of equivalents to which such claims are entitled.

What is claimed is:

1. An apparatus, comprising:
    a processor; and
    a memory coupled to the processor and storing instructions, wherein the instructions, when executed by the processor, cause the processor to:
        receive an identity public key from an identity device, wherein:
            the identity device is a subscriber identity module (SIM); and
            the identity public key and an identity private key are generated by the SIM based on a device secret of the SIM and in response to a request to modify content of the identity device;
        verify an identity of the SIM based on the identity public key;
        encrypt data corresponding to subscriber information using the identity public key;
        provide, to the identity device, the encrypted data to store the data in the identity device; and
        access a network operated by a network operator via the data stored in the identity device.

2. The apparatus of claim 1, wherein the network operator is a first network operator, and wherein the request to modify the content of the identity device comprises at least one of:
    a request to switch a network operator from a second network operator to the first network operator; and
    a request to add the first network operator.

3. The apparatus of claim 1, wherein the subscriber information provided to the identity device comprises at least one of:
    an international mobile subscriber identity (IMSI);
    an international mobile equipment identity (IMEI);
    a personal identification number (PIN);
    a personal unblocking code (PUC);
    a personal unblocking key (PUK); and
    an authentication key.

4. The apparatus of claim 1, wherein the SIM is an embedded subscriber identity module (eSIM).

5. An apparatus, comprising:
    a processor; and
    a memory coupled to the processor and storing instructions, wherein the instructions, when executed by the processor, cause the processor to:
        generate an identity public key and an identity private key based on a device secret of a subscriber identity module (SIM) and in response to receiving a request to modify content of the apparatus, wherein the apparatus is the SIM and the identity public key is associated with the SIM;
        provide the identity public key to a subscriber device, wherein an identity of the SIM is verified by the subscriber device based on the identity public key;
        receive, in response to the identity of the SIM being verified by the subscriber device, data from the subscriber device, wherein the received data are encrypted, by the subscriber device, using the identity public key;
        decrypt the received data using the identity private key; and
        modify, based on the decrypted data, the content of the apparatus.

6. The apparatus of claim 5, wherein a subscriber public key is further received from the subscriber device, and wherein the instructions cause the processor to:
    verify an identity of the subscriber device based at least on the subscriber public key.

7. The apparatus of claim 6, wherein the instructions cause the processor to discard, in response to the subscriber device not being verified, the data received from the subscriber device.

8. The apparatus of claim 6, wherein the instructions cause the processor to:
    receive, from the subscriber device, a subscriber public identification and a subscriber certificate along with the subscriber public key; and
    compare, to verify the identity of the subscriber device, the subscriber public key to an output of a decryption component, wherein the subscriber public identification, the subscriber certificate, and the subscriber public key are input into the decryption component.

9. The apparatus of claim 8, wherein the decryption component comprises a first decryptor and a second decryptor, and wherein:
    the subscriber public key and the subscriber certificate are input into the first subscriber decryptor; and
    an output of the first decryptor and the subscriber public key are input into the second decryptor, wherein an output of the second decryptor is compared to the subscriber public key.

10. The apparatus of claim 5, wherein the SIM is an embedded subscriber identity module (eSIM).

11. A method, comprising:
    generating, at an identity device corresponding to a subscriber identity module (SIM) and in response to receiving a request to modify content of the identity device, an identity public key and an identity private key based on a device secret of the SIM,
    providing the identity public key to a subscriber device, wherein the subscriber device verifies an identity of the SIM based on the identity public key;
    receiving, in response to the identity of the SIM being verified by the subscriber device data corresponding to subscriber information that are encrypted based on the identity public key; and modifying, in response to decrypting the data using the identity private key, the content of the identity device based on the decrypted subscriber information.

12. The method of claim 11, wherein modifying the content of the identity device based on the decrypted subscriber information comprises:
adding, to the identity device, a network operator associated with the decrypted subscriber information such that a network operated by the network operator is accessed, by the subscriber device, using the decrypted subscriber information stored in the identity device.

13. The method of claim 11, wherein the decrypted subscriber information corresponds to first network operator, and wherein modifying the content of the identity device based on the decrypted subscriber information comprises:
switching a network operator from a second network operator to the first network operator.

14. The method of claim 13, wherein switching the network operator from the second network operator to the first network operator comprises deleting subscriber information associated with the second network operator and previously stored in the identity device.

15. The method of claim 11, further comprising encrypting and decrypting the subscriber information using a device identification composition engine (DICE)-robust internet of thing (RIOT) protocol.

16. The method of claim 11, further comprising discarding the data corresponding to subscriber information in response to an identity of the subscriber device not being verified.

17. A system, comprising:
a subscriber device receives, from a server operated by a network operator, data corresponding to subscriber information; and
a subscriber identity module (SIM) in communication wirelessly with the subscriber device, wherein the SIM:
receives a request to modify content of data stored in the SIM;
generates an identity private key along with an identity public key based on a device secret of the SIM; and
provides the identity public key to the subscriber device, wherein the subscriber device verifies an identity of the SIM based on the identity public key,
wherein the subscriber device
encrypts, in response to verifying an identity of the SIM based at least in part on the identity public key, the data corresponding to the subscriber information based on the identity public key; and
provides, to the SIM, the encrypted data and a subscriber public key;
wherein the SIM decrypts the data corresponding to the subscriber information based on the identity private key to allow the subscriber device to access a network operated by the network operator using the subscriber information stored in the SIM.

18. The system of claim 17, wherein:
the subscriber device:
generates, in response to receiving the identity public key from the SIM, a subscriber public identification and a subscriber certificate along with the subscriber public key; and
provides, to the SIM, the subscriber public identification, the subscriber certificate, and the subscriber public key; and
the SIM performs, to verify the identity of the subscriber device, a comparison among the subscriber public identification, the subscriber certificate, and the subscriber public key.

19. The system of claim 17, wherein the subscriber device comprises an asymmetric identification generator, and wherein the subscriber device generates a private subscriber identification along with tho a public subscriber identification using the asymmetric identification generator.

20. The system of claim 17, wherein the subscriber device comprises an asymmetric key generator, and wherein the subscriber device generates a subscriber private key along with the subscriber public key using the asymmetric key generator.

21. The system of claim 17, wherein the data encrypted at the subscriber device corresponds to at least one of:
contact information stored in the subscriber device; and
information associated with text message.

* * * * *